(12) United States Patent
Secareanu

(10) Patent No.: US 12,506,716 B2
(45) Date of Patent: Dec. 23, 2025

(54) ENCRYPTED AND UNTRACEABLE DIGITAL COMMUNICATION

(71) Applicant: Radu Mircea Secareanu, Phoenix, AZ (US)

(72) Inventor: Radu Mircea Secareanu, Phoenix, AZ (US)

(73) Assignee: Radu Mircea Secareanu, Phoenix, AZ (US)

( * ) Notice: Subject to any disclaimer, the term of this patent is extended or adjusted under 35 U.S.C. 154(b) by 261 days.

(21) Appl. No.: 18/353,701

(22) Filed: Jul. 17, 2023

(65) Prior Publication Data

US 2025/0030668 A1    Jan. 23, 2025

(51) Int. Cl.
*H04L 9/40* (2022.01)
(52) U.S. Cl.
CPC ................. *H04L 63/0428* (2013.01)
(58) Field of Classification Search
CPC .................................................. H04L 63/0428
USPC ......................................................... 726/26
See application file for complete search history.

(56) References Cited

U.S. PATENT DOCUMENTS

| | | | | |
|---|---|---|---|---|
| 6,125,184 A * | 9/2000 | Dillon | ..... | H04L 63/08 380/43 |
| 6,760,439 B1 * | 7/2004 | Windirsch | ..... | H04L 9/0637 380/37 |
| 7,903,813 B2 * | 3/2011 | Duval | ..... | H04L 63/0428 380/43 |
| 8,355,499 B2 * | 1/2013 | Asnaashari | ..... | H04L 9/0631 380/42 |
| 8,462,943 B2 * | 6/2013 | Leech | ..... | H04L 9/00 713/153 |

(Continued)

*Primary Examiner* — Amare F Tabor

(57) ABSTRACT

An encrypted and untraceable communication between any two or more specially enabled devices that communicate in any network is disclosed, where the devices are enabled to engage in such communication by handling, sending, and receiving only encrypted data, where the data encryption is performed such that it is unique to the communication in-between any two devices in the network, where because of this said unique communication between any two devices in the network, a sender can place an encrypted message in the network at large, without specifying an address (or a phone number), message that will be looked at by all devices in the network and only the receiver that was intended by the sender to receive this message will be able to read it by uniquely decrypting it, therefore concealing the identity of the receiver, and where in order to conceal the identity of the sender, simulated calls in the same conditions and network traffic and activity as the real call are triggered by the real call, where these simulated calls are triggered in-between real devices in the network without the intervention or knowledge of the owner of those devices and where the owners of those devices can simultaneously initiate real calls, where means are provided to create a uniform network traffic at all times in order to conceal any sender or receiver (real or simulated) from being identified using techniques such as network traffic analysis means, and where means are provided to conceal the identity of a sender or a receiver from other traceable communication occurring in the network.

16 Claims, 6 Drawing Sheets

(56) References Cited

U.S. PATENT DOCUMENTS

| | | | | |
|---|---|---|---|---|
| 8,850,225 B2 * | 9/2014 | Noehring | ............... | H04L 9/065 |
| | | | | 713/189 |
| 10,482,270 B2 * | 11/2019 | Naedele | ............... | G06F 21/602 |
| 11,765,140 B2 * | 9/2023 | Farooq | ............... | H04L 63/0428 |

* cited by examiner

| No | Class |
|---|---|
| 1 | 4 |
| 2 | > 4 |
| 3 | 1_4 |
| 4 | 2_4 |
| 5 | 3_4 |
| 6 | 4_4 |
| 7 | 5_4 |
| 8 | 6_4 |
| 9 | 7_4 |
| 10 | 8_4 |

*FIG. 2*

| No | Class |
|---|---|
| 11 | 9_4 |
| 12 | 10_4 |
| 13 | 11_4 |
| 14 | 12_4 |
| 15 | 13_4 |
| 16 | 14_4 |
| 16+k | (14+k)_4 |
| (16+m)+1 | (14+m+1)_3 |
| (16+m)+2 | (14+m+2)_2 |
| (16+m)+3 | (14+m)_3_1 |
| (16+m)+4 | (14+m+1)_2_1 |
| (16+m)+5 | (14+m+2)_1_1 |
| (16+m)+6 | (14+m)_3_2 |
| (16+m)+7 | (14+m+1)_2_2 |
| (16+m)+8 | (14+m+2)_1_2 |
| (16+m)+9 | (14+m)_3_3 |
| (16+m)+10 | (14+m+1)_2_3 |
| (16+m)+11 | (14+m+2)_1_3 |
| (16+m)+12 | (14+m+3)_4 |

FIG. 3

ENCRYPTED AND UNTRACEABLE DIGITAL COMMUNICATION

FIELD

The present disclosure relates to binary data communication in an encrypted format, where, at the same time, the sender and the receiver of the data are not traceable by a third party, network, or carrier, and where the implementation of such communication is suitable to be implemented in silicon, as a circuit, in addition (or not only) to be implementable in software.

BACKGROUND

Certain aspects disclosed in the issued patents or utility patent applications (PUPA) mentioned below are being used in the present disclosure. These PUPA are filed by the same unique inventor as the present disclosure. These PUPA are mentioned here as background for this disclosure. The present disclosure represents new matter. These background PUPA are:

Patent Number: U.S. Pat. No. 11,677,416 (application Ser. No. 17/398,728)
Applicant Name: Radu Mircea Secareanu
Issue date: 13 Jun. 2023
Application Number: 17573438
Applicant Name: Radu Mircea Secareanu
Filing date: 11 Jan. 2022
Application Number: 17667650
Applicant Name: Radu Mircea Secareanu
Filing date: 9 Feb. 2022

SUMMARY

At the onset, a note regarding the structure of this disclosure is required, note that will enable better understanding of the flow of the disclosure. Key concepts are defined, detailed, and exemplified, concepts that the disclosed embodiments from the present disclosure are based on. The binary encrypted, non-traceable communication, or BENCO, is progressively introduced during this process.

Security and privacy in communication are paramount. Security breaches, which are common today, cause incommensurable damages at all levels—from financial, to personal privacy, to national security. Spy-type applications exist that monitor and intercept communications. The present disclosure provides solutions to both these challenges, by providing unique, dedicated, and non-interceptable encryption between any two or more parties, and at the same time untraceable communication between any two or more parties so that a third party, network, or carrier cannot determine the parties in a call. Both these, the content of the communication and who are the two (or more) parties in the call, can be determined only by using the device signatures from the manufacturer, as will be described in this disclosure.

In summary, BENCO works as follows. BENCO requires specially enabled devices. The communication can occur in any network.

Inside such a specially enabled device, an Input Full Data String (IFDS) is fully transformed into an equivalent string, EOS, where the EOS consists of sequential Processing Strings (PS), where any PS has a well-defined number of bits, with this number of bits being between a well defined minimum and maximum as a function of PS, where any PS comprising a well defined identifier and a remain part. The said well defined identifiers create a pool of identifiers that consists of well defined groups of identifiers where each such group has a well defined number of members with all such members within a group having the same well defined number of bits. Consequently, the remain part creates a similar pool comprising well defined groupings where each such grouping has a well defined number of members of same number of bits with this number being in-between a well defined minimum and maximum.

Since the groups and groupings are well defined, the members of each individual or combined (such as paired) group or grouping are processed (such as permutated) leading to one of the means of encryption. Said means of encryption lead to an essentially unlimited space of encryption keys.

Out of this space, a well defined number of keys are made specific for each such specially enabled device in existence that engages in a communication with any other such device. Every such device specific number of keys are hardcoded within that specially enabled specific device and are never shared on any communication channel, making the communication between any two existing specially enabled devices unique, specific, and non-readable by any other device.

Given this capability, a sender can place an encrypted message in the network at large, without specifying an address (or a phone number), message that will be looked at by every such specially enabled device in the network but only the receiver that was intended by the sender to receive this message will actually be able to read it. Consequently, the identity of the receiver is naturally concealed. The identity of the sender is concealed by triggering a number of simulated senders.

Means that prevent to determine the identity of the sender and receiver by employing network traffic or network data analysis methods are also disclosed. Means that prevent to determine the identity of the sender and receiver due to regular traceable communications that may occur in the network at the same time with the subject encrypted and untraceable communication are also provided.

Any type of specially enabled devices can be involved in an encrypted and non-traceable communication employing the object of this disclosure, such as phones and laptops for audio, video, and data communication, banking devices for various transactions, and even devices within the internet of things (IOT) network.

The implementation of BENCO consists in creating such specially enabled devices, as hardware devices or software devices. To make certain capabilities of such a communication to work best, the network may require higher performances, but this is not a requirement, as will be shown in this disclosure. The preferred implementation of BENCO is a hardware implementation (hardware devices). A software implementation (software devices) will replicate identically all the functionality, therefore the hardware and the software implementations are perfectly equivalent from the functionality point of view. However, while the functionality is equivalent, the security of a hardware implementation is superior. For this disclosure, the key to a security breach that will affect both encryption and traceability of a communication is to get the hardwired device specific encryption keys. In a hardware implementation, these keys are hardwired in silicon for every manufactured device. To obtain these keys, the entire database of hardwired keys from the manufacturer must be obtained. A security breach of such magnitude would be immediately known, and the users would be aware of the compromised communication, until for example the manufacturer recalls all devices. In a software implementation however, these keys are less safe, for such straightforward reasons as software being easier to breach, or since there may be more intermediaries between the manufacturer and the user such as a software vendor or support. A hardware implementation is more expensive than a software implementation, but for high security applications and users, the hardware implementation prevails in term of security. Evidently, since the hardware and software implementation has identical functionality, devices with hardware and devices with software implementation may coexist, the users with hardware implementation devices benefitting from an increased security.

Concerning the hardware implementation aspects, as will be apparent from the details presented in this disclosure to a person familiar with digital design, the preferred hardware implementation is, due to the serial nature of BENCO, a fully-pipelined based architecture. Such an architecture will provide the highest performance levels. Details concerning suggesting hardware implementations, and the software equivalency implementation, have been largely disclosed in PUPA, therefore these aspects will not be the main focus of the present disclosure.

BRIEF DESCRIPTION OF DRAWINGS

Embodiments will be described, by way of example, with reference to the drawings, in which

FIG. 2 and FIG. 3 are used to summarise the binary constructs, called Process Strings (PS) in which any arbitrary binary input string (IFDS) is partitioned, binary constructs that are represented by said set of RI, binary constructs that are used in one or more of the embodiments.

DETAILED DESCRIPTION OF THE INVENTION

At the outset it should be noted that the examples presented in the disclosure are in no way limiting, and the skilled person will appreciate that the disclosure is equally applicable to multiple variations and alternatives, and multiple optimizations are possible to increase the performance, such as the security levels and traceability. These variations, alternatives, optimizations are not described in this disclosure, and this does not represent any alteration to the merits of the disclosure since such variations, alternatives, optimizations are readily apparent to a person skilled in the art, and do not change the objective of the disclosure. Further, the disclosure is provided by using multiple examples, such that to facilitate straightforward understanding, at the same time in a compact, space-wise format. These examples do not limit in any way the general coverage applicable to the object of the disclosure. The specific numbers used in these examples are for illustration purpose only, and the practical values may be chosen for different objective or subjective reasons, without affecting what is disclosed here. And finally, multiple concepts, disclosed in PUPA, are only mentioned or implied in this disclosure, some concepts that may have notable implications in broadening the coverage, applicability, and performances resulting from this disclosure such as encryption space and communication traceability.

As disclosed in the above mentioned PUPA, any arbitrary IFDS can be described using a well defined set of PS, respectively a well defined set of RI. RI stands for Root Identifiers, as defined in PUPA. In PUPA, other types of identifiers have been defined, and encryption versions using those types of identifiers have been presented there. The object of this disclosure will be presented only referring to the RI type of identifiers, because other type of identifiers will only enhance performances, such as encryption strength, and such performance considerations do not change the object of this disclosure. The set of RI considered in this disclosure is summarised in FIG. 1, where:

Rows 101 and 104 detail existing RI classes. The RI classes are greater than 3, where the number represents the number of bits in the RI.

Rows 102 and 105 detail the number of distinct RI in each class, called RI class members, excluding RI corresponding to PS of same type bits.

Rows 103 and 106 detail the number of distinct RI in each class, called RI class members, including RI corresponding to PS of same type bits.

Figure 1:
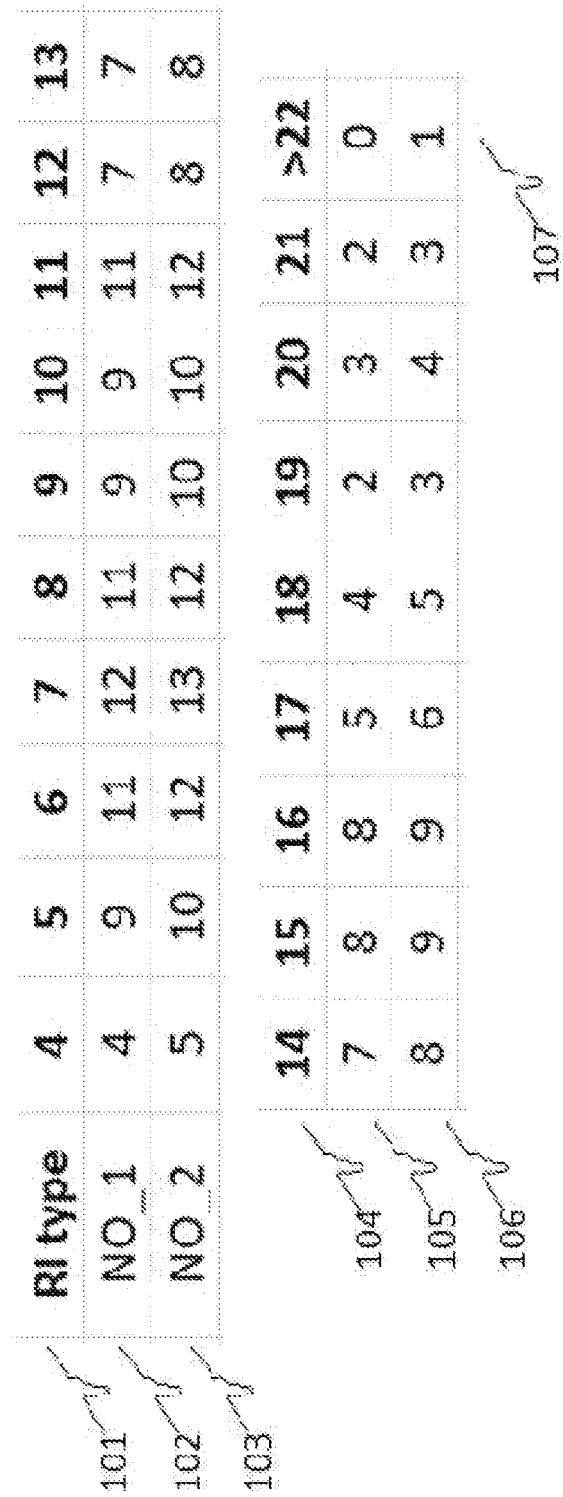
FIG. 1 is used to summarise the set of Root Identifiers (RI), set that is used to describe any arbitrary binary input string, set that is used in one or more of the embodiments.

Column 107, labelled ">22" (greater than 22), is placed in FIG. 1 for convenience, detailing in reality all PS of same type bits greater than 22. In reality, there is one entry/column for every PS of same type bits such as 22, 23, 24 . . . , theoretically to infinity, where each entry has one member. There are no RI greater than 22 other than RI describing same type bits PS.

The set of RI described in FIG. 1 corresponds to the PS classes shown in FIG. 2 and FIG. 3, where this is an example of a minimum set of classes necessary to describe any arbitrary IFDS. The set of RI described in FIG. 1 corresponds to m=k=1, where m and k are the variables that show up in FIG. 2 and FIG. 3, with their meaning described in PUPA and summarized below.

As mentioned, in order to be able to encrypt an arbitrary IFDS according to this disclosure, that arbitrary IFDS must be fully described using a set of limited number of PS types, or classes. The PS classes, and their derivation, have been disclosed in PUPA. A derivation of the PS classes lead to the classes shown in FIG. 2 and FIG. 3, where FIG. 3 is a continuation of FIG. 2. In these two figures:

201 column is an index, or a counter, showing how many PS classes 202 column is showing the corresponding PS class, for every index The 203 row in FIG. 2 relates to exception PS (per the exception PS definition). In reality, there is a class for exception PS of class 5, one for class 6, and so on. Row 203 condenses all these classes into one entry.

Classes 1_4 to 14_4 do not require any further comments. These are full PS classes.

At row 204 in FIG. 3, variable k is introduced.

This k variable has a range from 1 to m, with m being the maximum value. Variable m can be minimum 1, case in which the range for k is 1 to 1, i.e. 1.

All classes (14+k)_4 are regular, full PS classes. Note that position 204 represents multiple entries. For example, if m=10, position 204 represents ten entries, i.e. ten classes, from 15_4 to 24_4. If m=1, position 204 represents one entry, i.e. class 15_4.

The value for m is chosen as one of the variables to increase the encryption strength. The larger the m value, the stronger the encryption, but the larger the complexity, where one of the implementation measures for complexity is the memory needs.

Since the memory needs is mentioned, clarifications are required. For example, if m=1, the memory needs needed to encrypt all configurations is about 190k binary words of 22 bits. If m=13, the memory needs to encrypt all configurations reaches about 300M binary words of 34 bits. As m increases further, the trend is apparent (memory increases and the binary word necessary for one memory location increases).

Starting with 205, the maximum value of k, which is m, is relevant. To focus the discussion, m=1 (k=1) will be considered.

204, position 17, is class 15_4.

205 and 206 are classes 16_3 and 17_2.

Regular full PS classes, of format such as 15_4 (generally x_4) mean that in the 15 bits preceding the 4 same type bit termination, any combination of same type bit groups of 1, 2, and 3 bits can occur. Classes 16_3 and 17_2 have the same meaning, but the termination is 3, respectively 2 same type bits. Both classes 16_3 and 17_2 use a link bit just like a regular full PS, so, after the 3, respectively 2 termination, any number of bits of same type or opposite type as the termination can occur.

Positions 207 to 215 consist of three groups of classes: the 15_3 group, the 16_2 group, and the 17_1 group.

Each group consists of three classes: 15_3_1, 15_3_2, and 15_3_3, then 16_2_1, 16_2_2, and 16_2_3, respectively 17_1_1, 17_1_2, and 17_1_3.

The meaning of the three numbers is as discussed above. For example 15_3_1: 15 supports any combination of 1, 2, and 3 same type bits, and 3 and 1 are terminations of 3 respectively 1 same type bit groups. The last bit in the 15 always changes value with the group of 3, which always changes value with the group of 1.

The first two numbers always make 18 when summed (15+3, 16+2, and 17+1).

15_3, 16_2 and 17_1 are the only possible combinations in an 18 bit in the defined conditions disclosed here.

The third bit is always 1, 2, and 3 for all three 15_3, 16_2, and 17_1 groups.

None of the nine classes require a link bit (LB). This is key, because it allows to "pack" double the amount of output combinations in the same number of bits. This also means that the bit coming after the 1, 2, respectively 3 same type bit termination, always changes value.

Note that all three groups generate 18_1, 18_2, and 18_3, in different configurations (as 15_3, 16_2, or 17_1). So, in order to close and have any combination possible, regular 18_4 full PS class (with LB) is needed to be added—and that is done on position 216 (position 29 for m=1).

Accordingly, the above collection of classes, as presented and discussed with regard to FIG. 2 and FIG. 3, permit the encryption of any IFDS, using a predefined maximum number of bits.

In the case of m=1, this predefined maximum number of bits is 22 (18+4 from class 18_4).

In the case of m=13, this predefined number of bits is 34 (30+4 from class 30_4).

For any m, classes at positions 207 to 215 offer the needed open string. Classes at 207 to 215 are open string PS classes. These classes clearly have their own RI.

The number of required classes to cover any IFDS depends on the encryption strength that is chosen. For example, for m=1, 29 classes are needed. For m=13, 41 classes are needed. In other words, the number of classes required to cover any IFDS is 28+m.

The set of RI described in FIG. 1 corresponds to m=1, and this particular case will be primarily discussed to exemplify certain key aspects in this disclosure.

As mentioned, any PS has a well-defined number of bits, with this number of bits being between a well defined minimum and maximum as a function of PS, where any PS comprising a well defined identifier and a remain part.

a. Given FIG. 1, FIG. 2, and FIG. 3, it is apparent that for m=1, the said well defined number of bits is in-between 4 (for PS class 0_4) and 22 (for PS class 18_4).

b. As disclosed in PUPA, every PS class is described by one or more RI. To exemplify here for the convenience of the reader, class 4_4 is described by three RI, one of five bits (class 5 RI), one of six (class 6 RI) and one of seven (class 7 RI) bits. The said "well defined identifiers" refer to these RI.

c. The said "remain part" is represented by the number of bits of the considered PS class minus the number of bits for the applicable RI. For example, for class 4_4, the class has 8 bits total. If the five bit RI is applicable for a PS of class 4_4, then the remain part will have 8 minus 5 bits, equal three bits. As disclosed in PUPA, the remain part includes the link bit (if the class require one, such as class 4_4), or not (if the class does not require one, such as class 15_3_1). Note that the number of bits in the remain part is, for m=1, between 0 and 18.

It is apparent at this time that the said well defined groups of identifiers are the RI classes of FIG. 1, and the said well defined groupings are the remain bits of each class. Processing (such as making permutations of) the members within a group or grouping generates an encryption subkey. There is one subkey for every group or grouping having more than one member. Assembling all subkeys for all groups and groupings leads to an encryption key. For example, assembling subkeys of only RI class 4 and class 5 (see FIG. 1) will lead to an encryption key of 7 bits (to represent permutations of five members) plus 26 bits (to represent permutations of 10 members), for a total of 33 bits, and an encryption space of about 4000 million possibilities. And these are only two of the 18 RI classes (the groups as defined above). The groupings have much more members, therefore fundamentally larger encryption subkeys and possibilities. And this is only for m=1 (it is apparent now a reason why the statement made above—larger m, larger encryption strength), and that is because the number of groups and groupings, and the number of each of their members, increase substantially with m, increasing almost exponentially the encryption space. Assembling all these subkeys will generate encryption keys to be more than a few thousand bits in size.

Clearly, other encryption key types can be generated as disclosed in the PUPA, an example being when the groups or groupings are combined (such as paired), or when other types of identifiers and remain groups and groupings are used. These are disclosed in PUPA and are not reviewed here, because these are not essential for the substance of the disclosure.

Assembling all these keys generate a global encryption key. The assembly of these keys generate essentially, for all practical reasons, an infinite global encryption space represented by said global keys. Increasing the m variable expands even further this global encryption space-expanding the encryption space is not essential (because the encryption space is already in no need of expansion even for m=1, being that large that are represented by keys of a few thousand bits in size), but what this expansion does is it increases the variability of the global encryption space, which is fundamentally beneficial.

As mentioned, in order to be able to make an encrypted and untraceable call as disclosed here, specially enabled devices are required. One key feature of these specially enabled devices is that they each have allocated a set of unique global encryption keys. Out of the global encryption space described above, one key, or more than one well defined number of keys, are made specific for each such specially enabled device in existence that engages in such encrypted and untraceable communication with any other such specially enabled device, keys that are hardcoded within the two specific devices only, and are never shared on any communication channel, making the communication between any two such specially enabled existing devices unique, specific, and non-readable by any other device, network, or the carrier. Given this capability, a sender having such specially enabled device can place an encrypted message in the network at large, without specifying an address (or a phone number), message that will be looked at by every other existing such specially enabled device in the network but only the receiver having such specially enabled device that was intended by the sender to receive this message will actually be able to read it. Consequently, the identity of the receiver is naturally concealed. The identity of the sender is concealed by triggering a number of simulated senders, as described below. Means that prevent to determine the identity of the sender and receiver by employing network traffic or network data analysis methods are also disclosed. Means that prevent to determine the identity of the sender and receiver due to regular traceable communications that may occur in the network at the same time with the subject encrypted and untraceable communication are also provided. Note that this non-traceable feature is fundamentally enabled by the said unique and specific communication between any two such specially enabled devices.

To better understand the remaining of the disclosure, particular examples are used. These examples can be generalized and scope expanded to any other means such as implementation, protocols, or device, and these examples in no way limits the present disclosure. The specially enabled devices used in these examples are telephones, therefore the subject communication is an encrypted, non-traceable telephone communication between two specific specially enabled devices.

Consider 1 million subscribers to this service that enables to make encrypted and untraceable calls. Each subscriber must have a telephone (device) that supports this service, i.e. a specially enabled telephone (device). These 1 million subscribers may have the same carrier or different carriers. There are no requirements for a carrier to provide this service-desirably, the carrier is on a high performance network, as will be discussed in this disclosure, but that is not a requirement. In order to be able to make such encrypted and untraceable calls, a telephone must have a chip, or a software, both providing the same functionality, with the chip version providing even further increased security from the software version of the device. Next, no distinction in the description will be made between the chip/hardware and software versions, unless specifically mentioned.

For the rest of the disclosure, a specially enabled device will be referred to as simply "device". When reference to devices that are not specially enabled will be made, such reference will be made in clear.

From the manufacturer, every such device comes with a set of hardwired global encryption keys. For example, every device comes from the manufacturer with 5 million hardwired keys. Note that in order to hardwire 5 million encryption keys, at 2000 bits per key, a memory space of 10 Gb is needed. In order for one device to uniquely communicate with another device, one such key is needed. Therefore, in this example, every device is capable to uniquely communicate with 5 million devices. Of course, multiple variations are possible, such as multiple unique keys can be allocated for one device to communicate with another device, where for example the keys change dynamically in time, this leading to even more increased encryption strength. Or, in order to have less memory requirement, a device comes from the manufacturer with only 1000 keys (instead of five million), and in order for one device to uniquely communicate with another device, while keeping the 5 million device capability, combination of the 1000 keys taken three (or combination of 1000 taken 20 for more variability and strength) are implemented. Note that in this case, if combination of 1000 keys taken three is implemented, while the full message will remain unique between the sender and receiver, parts of the message can be intercepted by other devices, since every one of the three keys is used by other devices as well in said combination of 100 taken three, therefore, such arrangement is less expensive (less memory) but is less safe at the same time.

At the manufacturer, every device receives an ID hardwired in silicon. For a software version, such ID can be a software installation ID. If both hardware and software devices coexist, the IDs in chips and the IDs in software are different, so that such devices can both coexist and be supported in the same network. Within every device, the manufacturer assigned such ID to the global encryption key(s) within each device. For example, if every device is capable to support unique communication with 5 million other devices, the IDs of these devices will be assigned by the manufacturer to the unique keys within every device. Note another memory requirement that the device must support. In the scenario of one key per unique communication between two devices, for all five million devices, 5 million IDs and (5 million) times (5 million) unique keys are hardcoded. Note that, in this example, at this point, from the manufacturer, every device will be capable to support unique encrypted and untraceable calls to 5 million other devices. These 5 million other devices may or may not be in existence (i.e. manufactured) at a given time—in other words this hardcoding of keys and IDs by the manufacturer is forward looking, and it is a requirement to make such encrypted and untraceable calls. If, at any time in the future, there will be more than 5 million devices manufactured (therefore more than 5 million users), calls to or from the newer than 5 million devices, calls that are encrypted and untraceable, cannot be made. At that time, a new device is required, that will be able to support for example ten million devices, or subscribers. The old devices will still be able to be used to make encrypted and untraceable calls but only between the initial 5 million subscribers.

It was mentioned below that in order to support 5 million devices, (5 million) times (5 million) global encryption keys are needed—that is $25*10^{12}$ unique keys. Rounding this number to $10^{15}$, that is $2^{50}$ keys, which can be represented by 50 bits. Considering that the global encryption space consists of only $2^{2000}$ encryption keys (it may be much more than that), note the completely negligible number of keys that are in use out of the available space. That is another strong capability of the disclosure, making it practically impossible for a third party to guess even only an encryption key that is in use, not to mention the proper encryption key for that specific communication that may be of interest for that third party.

As mentioned, the assigned keys and IDs from the manufacturer, within every device, are forward looking, and represent the device capability to support a certain number of encrypted and untraceable calls. As part of the maintenance and update, every carrier will download in every device the phone numbers of all existing subscribers at a given time, regardless of the carrier, where these existing subscribers are less than 5 million in this example (the device capacity). This download will be the same for all devices, i.e. the subscriber phone numbers will be in the same order downloaded in all devices. Every time when a new subscriber signs up, regardless of the carrier, the phone number of this new subscriber gets downloaded in all devices. Only at that time, within every device, a key and ID from the manufacturer will correspond to a subscriber. Note that only the manufacturer will be able to make the correspondence between key, ID and subscriber for a specific device and key to subscriber correspondence is obviously different for every device, since every device-to-device communication is unique. A carrier will not be able to make this correspondence between key and subscriber, and this is essential in having the untraceable capability. Note also that if for example a SIM card is stolen and used on a different device, even if that device supports encrypted and untraceable calls, the calls will not work since the correspondence between the phone number and the key, ID changes, therefore no device will be able to decrypt the data encrypted by the device with the stolen SIM card.

Figure 4:
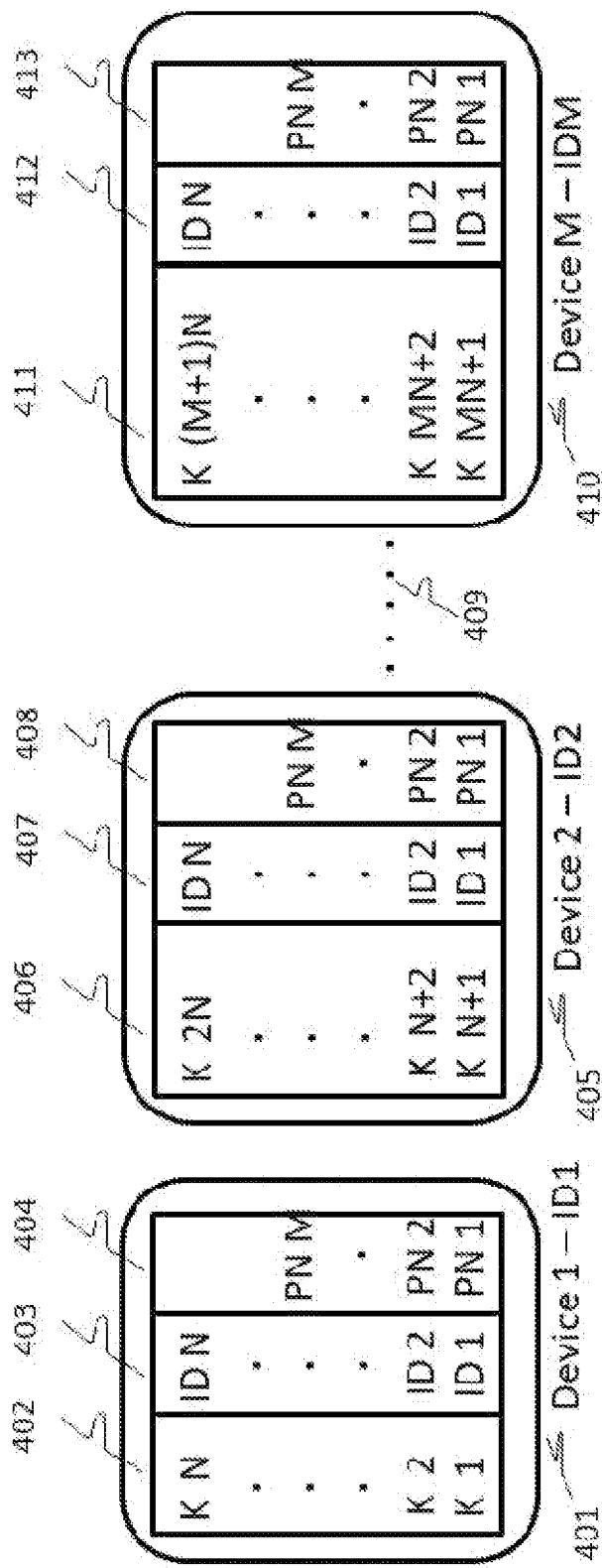
FIG. 4 is used to summarise the content and organization of data that is required to exist in every specially enabled device in order to enable that device to initiate and receive encrypted and untraceable calls, as used in one or more of the embodiments.

The discussion above is concluded with the illustration in FIG. 4, where M subscribers, therefore M devices are depicted. Above, M was 1 million.

In FIGS. 4, 401, 405, 409, and 410 illustrate the M devices, where 409, the dots, indicate many devices between device 2 and device M.

Every device, on columns 402, 406, one 411, store the encryption/decryption keys assigned by the manufactures. For example, if device 1 would communicate with device 2, as shown in FIG. 4, would use the keys stored at location (K 2) respectively at location (K N+1). There are two options. Option 1 is for example when there is one key stored, that is used both to encrypt data for device 2 and decrypt data from device 2. Option 2 is for example when there are two keys stored, one used to encrypt data for device 2 and another one used to decrypt data from device 2. Similar at (K N+1), where for example in the two keys case, the key used by device 1 to encrypt data for device 2 will be found (K N+1) and will be used to decrypt data from device 1, while the key used by device 1 to decrypt data from device 2 will be also found at (K N+1) and will be used to encrypt data for device 1. These two keys will only be found at these locations, in device 1 and device 2 respectively.

The device IDs, from the manufacturer, are shown on columns 403, 407, and 412. There are N IDs depicted. Above, N was 5 million. The manufacturer may work with the carrier for extra security, so that when the carrier issues a phone number and therefore a SIM card, that SIM card has an ID coded in it also. Therefore, if the SIM card is stolen, it cannot be used on another device.

The phone numbers, assigned by the carrier, are depicted on columns 404, 408, and 413. Note that there are M phone numbers, i.e. the same number as the number of devices or subscribers in use at the current time. Above, this number was 1 million.

At this time, the procedure, or protocol, as to how an encrypted and untraceable call between any two subscribers works, can be introduced and detailed. The subscriber initiating a call has multiple options to customize the strength of intractability and encryption. In PUPA, it has been shown how the encryption strength can be increased and customized. Below, how the intractability strength of such a call works is being disclosed.

The fundamental principle of this disclosure to make an intractable or untraceable call is the fact that any two devices that communicate encrypted according to this disclosure, can uniquely communicate, and no third party can intercept (decrypt) this communication. Given this capability, a sender can place an encrypted message in the network at large, without specifying an address (or a phone number), message that will be looked at by everybody in the network but only the receiver that was intended by the sender to receive this message will actually be able to read it.

Since the existing subscribers may belong to various carriers, the carrier is not relevant for such calls. The only relevant aspect in making such a call is the downloaded subscribers in every device (all in the same order for every device), as shown and explained with regard to FIG. 4. That is, when above is stated that "a sender can place an encrypted message in the network at large, without specifying a phone number" means that the sender device will send the message to all the phone numbers (devices) of all downloaded subscribers to this type of service. Obviously, since a carrier has regular users (non-encrypted and traceable calls) as well, the phone numbers of these regular users are not part of these calls, downloads, and process, as explained above and as will be detailed further below. As an additional implementation insight example on how a sender can place a call in the network at large, the following two option examples can be provided:

One option is that a subscriber initiating such a call calls a 1-800 number (a switchboard) where he sends this encrypted message destined to a specific encrypted receiver. This 1-800 number is valid for all carriers. The switchboard will know to send the encrypted message to all subscribers, therefore, no phone number must be specified in clear by the sender device.

The second option is that such a 1-800 switchboard does not exist. In this case, the sender device will specify the phone numbers of all subscriber devices in clear, and send the encrypted message to everybody this way.

In either case, the effect is the same, because the carriers and network will be able to see in both cases that the encrypted message was sent to all subscribers. The existence of a switchboard is just an optimization which will enable to send the message to multiple subscribers in parallel, improving therefore the communication speed, as compared to the second option when the sender device is doing the switchboard job serially.

There is no effect of either of these two options on traceability, since from the traceability point of view, both options are equivalent—the carriers and the network will see the same information.

In the rest of the disclosure, this aspect will be self-understood as either of the two options being applied, and will not be mentioned unless there are specific details that will alter this behaviour. Preferably, the switchboard option is applied, because of the speed advantage.

Applying this fundamental principle described above, in a first scenario, when a sender places an encrypted message in the network at large, the sender identity is visible to anybody in the network, while the receiver identity cannot be determined by anybody. Obviously, there is a probability to determine who the receiver is, and this probability depends on how many registered users are in the network. However, this probability is theoretical, since even if a third party guesses the receiver, the receiver cannot be proven because in order to prove the receiver, a third party must read the message and that read message be intelligible, and that cannot be done since the message at the suspected receiver cannot be read in clear by this third party. Not even the network, or the carrier, will be able to tell who the receiver is, since the network and the carrier will see uniform traffic from the sender to all other devices in the network.

The same fundamental principle applies to conceal the sender. Therefore, in a second scenario, it is considered that, customary, when a sender places an encrypted message in the network at large, this sender triggers a number of other senders, named simulated senders. These simulated senders will place simulated encrypted messages, or simulated data, in the network at large. When simulated senders are triggered, a simulated receiver for each of these simulated senders is decided. Given that multiple senders place a message in the network, a third party will not be able to tell which one of all the senders placed the real message, therefore the identity of the real sender becomes concealed as well. Therefore, a third party will not be able to tell neither who the sender is, nor who the receiver is. Similarly, the network, or the carrier, will not be able to tell who the real sender and the receiver is as well. The network, or the carrier, will be able to tell only who all the senders are, but will not be able to distinguish which one is the real sender, and which are simulated senders. Obviously, just as discussed above for the receiver, there is a probability to determine the real sender, and this probability depends on how many other senders have been triggered to place simulated messages in the network. And similarly, this probability is theoretical, because, similarly as in the discussion for the receiver, the third party, or the carrier, cannot prove the real sender because a message sent by a sender (real or simulated) cannot be read in clear by a third party.

Figure 5:
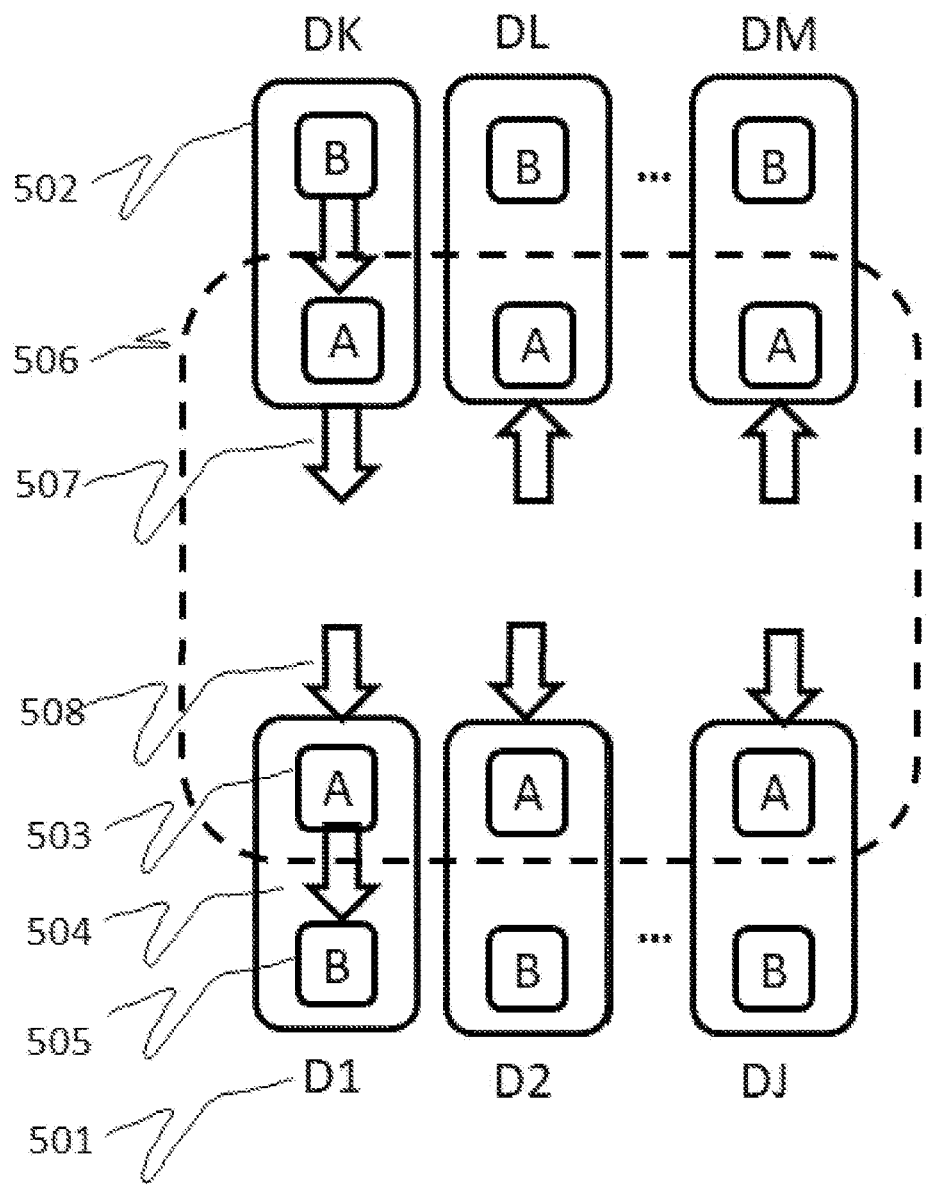
FIG. 5 is used to summarise the fundaments of an encrypted and untraceable communication between two said specially enabled devices, a sender and a receiver, where the sender is visible and the receiver is concealed, as used in one or more of the embodiments.
Figure 6:
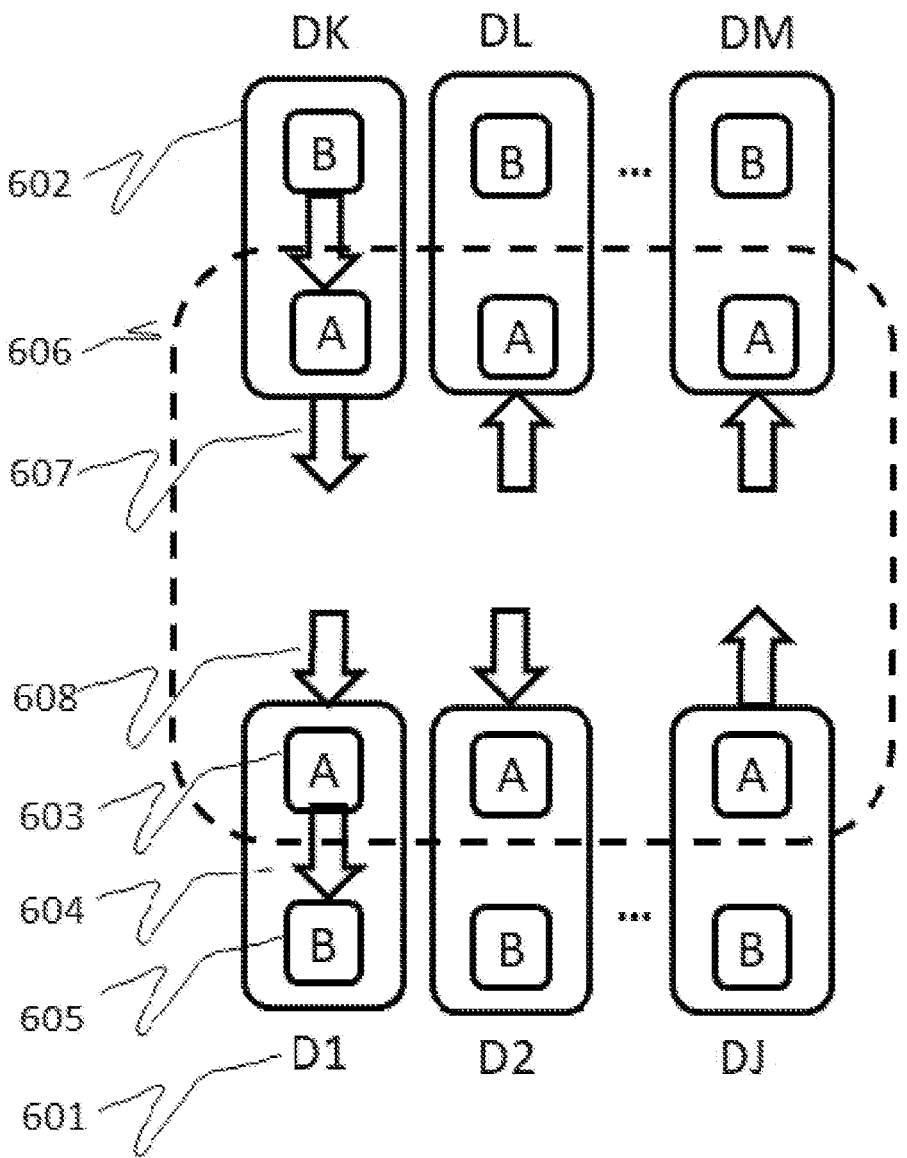
FIG. 6 is used to summarise the fundaments of an encrypted and untraceable communication between two said specially enabled devices, a sender and a receiver, where both the sender and the receiver are concealed, as used in one or more of the embodiments.

These two fundamental cases are depicted in FIG. 5, respectively in FIG. 6. FIG. 5 depicts the fundamental situation, for a communication where the sender is visible and the receiver is concealed, and FIG. 6 depicts the more secure case, for a communication where both the sender and the receiver are concealed.

Discussing the communication depicted in FIG. 5:
a. There are M devices shown, for the M subscribers in existence at the current time, where 501 points to the device name. In FIG. 5, device names D1, D2, DJ, DK, DL, and DM are shown.
b. Each device consists of two parts, A and B. These are depicted in FIG. 5 as 502 pointing to the contour of the entire device, 503 pointing to part A of the device, and 505 pointing to part B of the device.
c. Inside contour 506 depicts the internal parts of the network. Outside contour 506 are the external parts of the network. Note that part A of each device is considered as being inside the network, while part B of each device is considered as being outside the network.
d. Part A of each device is considered as being internal to the network, and contains all the infrastructure to connect to the network, send and receive simulated and real data, encrypt and decrypt data. The activities of part A are not visible to a user.
e. Part B of each device is considered as being external to the network, and contains components such as to interact with the user (ringer, microphone, speaker, and all associated hardware), as well as components to handle and prepare data (such as the A-to-D and D-to-A converters).
f. An arrow between A and B, depicted as 504, signifies that part A and part B of that device exchange data.
   a. When arrow 504 points from A to B, signifies that within that device a message has been correctly decrypted, and therefore the phone rings, informing the user that there is an incoming call, and the decrypted data will be transmitted from part A to the D-to-A converter in part B.
   b. When arrow 504 points from B to A, signifies that the subscriber completed the message to be sent to the intended receiver, the message has been converted by the A-to-D converter, and is sent into part A of the device where is appropriately encrypted for the intended receiver.
   c. An arrow from a device towards the internals of the network, depicted as 507, signifies that the encrypted data, appropriately encrypted for a specific sender by the respective device, which is the sender, is placed in the network for all devices in the network.
   d. An arrow from the internals of the network towards a device, depicted as 508, signifies that the encrypted data placed in the network by a sender, is being picked up by that device, to decrypt and interpret.
   e. Note that in FIG. 5, there is one sender, device DK, and all other devices are receivers. Device D1 is the real receiver, therefore the call is made between device DK and device D1. Device DK is visible by anybody, i.e. a third party will know that device DK made a call. Device D1 is not visible by anybody, therefore a third party will not be able to say who Device DK called.

Discussing the communication depicted in FIG. 6:
a. All 601-to-608 have exactly the same meaning and are equivalent to 501-to-508 from FIG. 5.
b. In FIG. 6, note that there are two senders depicted, Devices DK and DJ, while all other devices are receivers. DK is a real sender, and DJ is a simulated sender, where a simulated sender behaves as defined in this disclosure. Compared to the communication depicted in FIG. 5, where a third party was able to say that Device DK made a call but did not know who the recipient was, for the communication depicted in FIG. 6, a third party will not be able to say who the caller is either. A third party will see that the caller is either Device DJ or Device DK, but cannot know for sure which one. And similarly to the communication depicted in FIG. 5, will not be able to say who the receiver is, i.e. who Device DJ or Device DK called.

c. Note that a simulated sender is depicted in FIG. 6, as Device DJ. There is no communication between parts B and A of that device for a simulated sender. A simulated receiver will exist, but is not identified in FIG. 6, since a simulated receiver will not communicate from part A into part B of that device. Such aspects, together with the functionality of a simulated sender and simulated receiver, will be discussed later in the disclosure.

The above occurs when a single real sender and a single real receiver (i.e. a single call) exists in the entire network. When multiple calls occur in the network, then the probability for a third party to determine the real senders and the receivers decreases dramatically, even more so when a specific sender needs to be matched with a specific receiver in order to determine the specific identity of a real call.

A straightforward example is used in order to better understand the above. Consider that every real sender triggers three simulated senders, and there are ten independent calls in the network. Consequently, there are ten real senders and thirty simulated senders in the network. It is also considered that the network has one thousand registered users. The network traffic for the ten independent calls will be as follows: the forty senders will each send one message in the network, where each of these forty messages will be received by all one thousand registered users. Therefore, the network activity and traffic for the ten calls will consist in forty messages that are read by 1000 devices. As mentioned, each of the one thousand registered users will receive forty messages. The device corresponding to each of the 1000 registered users will decrypt each of the forty messages one thousand times, using the keys that have a downloaded phone number, as described above; therefore each device will perform forty thousand decrypt operations. If any of the forty thousand decrypt operations will produce an intelligible outcome (where a criteria to determine an intelligible outcome will be described later), then only at that time the device will make the device (phone) ring, informing the actual subscriber (user) that a call is received. Note that there are forty million decrypt operations being performed by all one thousand devices, and only forty devices (forty receivers) will ultimately produce an intelligible outcome. Out of these forty devices with intelligible outcome, thirty are simulated receivers and ten are real receivers. Only the ten real receivers will make the respective device (phone) ring to inform the user of the call, the thirty simulated receivers will not make the respective device ring. The subscribers (users) of none of the 1000 devices besides the ten devices that will make the phone ring, are aware of the process happening in their devices. Several aspects are apparent from this example:

a. The concealing strength of a sender depends on
  i. How many real calls are in the network at a given time (more calls, higher strength). A user can have the possibility to choose when to make a call, such as to choose to make a call when the network activity is higher, so that the concealing strength is naturally higher.
  ii. How many simulated devices are being triggered (more triggered devices, higher strength). A user can have the possibility to choose how many simulated senders are being triggered. For example, the user can choose from none (such as when the network activity is very high), to three, to 31, to 1023, etc. Different users (different calls) can have different number of triggered devices.

b. The concealing strength of a receiver is practically a direct function of the number of registered users. A user making a call cannot influence this.

c. The concealing strength of a call (to determine the sender-receiver pair) is a mathematical relationship (such as combined probability) between the concealing strength of the sender and concealing strength of the receiver.

d. Clearly, the higher the concealing strength, the higher the network activity, therefore the higher the cost of a call. That is even more true as the number of registered users increase. Examples to reduce the network activity (therefore the cost of a call) for networks with a large number of registered users, are disclosed next. Such examples can naturally be extended by a person skilled in the art, with many other alternative techniques to reduce network activity already existing in the art, therefore this is not a focus of this disclosure.

e. In a network with multiple calls (multiple real senders) or with multiple simulated senders, every device will have a large activity (in the above example, every receiver device had to perform 40,000 decryptions). This can lead to a notable delay from when the message is send by a sender user, and is received by the target receiver user. There are multiple consequences, such as:
  i. Device processing speed. A device with a higher processing speed will reduce this delay. For example, hardware is faster than software, and within hardware, various architectures can provide further speed improvements. Parallel pipelined architectures can provide notable benefits for such speed aspect.
  ii. Network capabilities, including network bandwidth. A more performant network will reduce this delay. For example, a performing network will deliver the messages faster in-between devices, and can handle larger messages.
  iii. In a network with multiple calls, the network activity increases, and this will increase the delay. Therefore means to reduce the network activity without impacting the useful data transfer between target devices, are needed. Examples are disclosed next.

It is apparent at this time that the most secure and efficient communication is insured as a text-style communication, i.e. the sender talks for any amount of time (or prepares the message in a text/data format) and hangs up. The corresponding data is send as described above concealed for the sender and receiver, and the data arrives with no real pressure regarding the network capabilities or device speed, so that the delay in-between the sender and when the receiver receives the data is not of paramount importance. After the receiver listens (reviews) the message, the receiver does exactly the same process as described above for the sender. This is repeated as long as sender and receiver want to communicate back and forth. The disadvantage of this communication style is that if this back-and-forth communication between the sender and receiver continues for long enough within a tight time interval (i.e. the sender and the receiver communicates promptly), it may create a data traffic pattern that can be detected by means of a data analysis in the network. Even more so when the simulated senders have different assignments for sender and receiver every time the sender and the receiver communicates. That is because the sender and the receiver may reveal their identity after a network traffic analysis because their devices will appear most of the times sending messages in the network (their devices will show peaking in traffic occurrences compared to other devices in the network). Of course, this may not be an issue in a network with high traffic, because all other devices will show with high activity, but high traffic network would be a particular case, and a user cannot rely on this to occur in order to optimally conceal the communication. Several solutions are possible to minimize this potential issue:

a. Communication between sender and receiver occurs in time, i.e. sender and receiver responds to each-other not promptly. This type of communication is called in this disclosure "time distributed text-style communication". This will eliminate the traffic peaks for the sender and receiver devices, because in time, all devices average in term of network activity for reasons such as the fact that choosing devices that are simulated senders is random, therefore the sender and receiver devices may be chosen several times as random simulated senders while this time distributed communication between the sender and receiver takes place. This is the best solution in term of security (sender and receiver remain optimally concealed), and in term of demands on network performances (aspects such as network bandwidth, sender-to-receiver delay, device speed performance, all remain muted). Clearly, such a time distributed communication may not always be possible, such as when prompt responses in-between sender and receiver are required.

b. When prompt responses between sender and receiver are required, two preferred solutions are possible, where the two solutions are related in term of implementation.

a. The first solution is called in this disclosure "equalized activity text-style communication". Fundamentally, this equalized activity communication consists in maintaining the same text-style communication as described above, but in order to hide the peak in the network activity of the sender and receiver devices, which can be detected from a network activity analysis, have the activity of all the associated simulated senders and receivers to be similar as the sender and receiver activity, therefore equalize the activity of the simulated senders and receivers with the activity of the real sender and receiver. This can be achieved straightforward by keeping the same simulated senders for a set period of time in-between sends. If this set period of time expires, then it is the scenario mentioned above, i.e. the time distributed communication. For receivers, in the above scenario, they are highly concealed. In the current scenario, the simulated receivers become simulated senders when the receiver replies to the sender, and the original simulated senders become simulated receivers when the receiver replies to the sender. Therefore, in this scenario, there is the real sender and receiver, and there are the simulated senders and simulated receivers, that interchange functions over the time of the bidirectional communication, and these simulated senders and simulated receivers remain the same over the entire duration of the communication as long as the sender/receiver replies to receiver/sender within a set time. If this set time is not met at any time during the communication, the simulated senders/receivers change as detailed above, for the time-distributed communication. For example, if the call initiator decides at three simulated senders to conceal its identity, there will be three simulated receivers that will show up as a group together with the real receiver when the real receiver replies, therefore in this example there will be four senders and four receivers that will switch sender/receiver status for the duration of the call. These eight devices will be constant and have the same network activity.

b. The second solution is called in this disclosure "call style communication", where the sender and receiver never hang up until the call ends. Clearly this has the advantage of being the fastest in term of response from the sender to receiver or receiver to sender, and this is the main reason why such communication would be engaged. In term of concealing the identity of sender and receiver, this is exactly the same as the equalizing activity communication described above, and the implementation is also as described above. The disadvantage is that the network performance induced delay, such as in-between when the sender sends and when receiver receives the message, is the most obvious in this case, because the sender and receiver remains on-line, waiting. Also, the device performance in term of speed is also the most visible, potentially adding notably to the communication delay between the sender and the receiver. Therefore, this solution works best for a high performance network, or when specific means to compensate for lower performance network are implemented, for high speed and performance devices, and for implementation means that will address network traffic and device processing load such as device clustering, discussed below. Aspects regarding the network performance and capacity are not the subject of this disclosure, and therefore will not be discussed.

To clarify some of the above aspects that have been introduced without sufficient clarity, further examples are provided next. These examples are by no means restrictive to the disclosure, and a person skilled in the art can develop multiple versions, alternatives, and optimizations. Such versions, alternatives and optimizations are not described here, since, to a person skilled in the art, such versions, alternatives, and optimizations are obvious.

a. One approach to address the network activity issues and device activity issues mentioned above, is to create clusters of users (devices). As mentioned, the carrier updates all devices with all subscribers that sign up, where for all devices the subscribers have the same order. For example, for every 1,000 subscribers that sign up, a subscriber cluster is formed. Within a cluster, the subscribers are simply in the order they subscribed, for example, subscribers 1-to-1000 form cluster 1, subscribers 1001-to-2000 form cluster 2, and so on. Forming the cluster is automatic, at device level, and do not require any intervention from other parties (such as the manufacturer) or equipment (such as switchboard), or the carrier, or the network. Clearly, the switchboard will take over a lot of the functionality in term of traffic and coordination within a cluster and in-between clusters, with these aspects being inferred even if not specifically outlined in the description below. These are aspects that are obvious to a person skilled in the art. In this example, since there are 1 million subscribers, there are 1000 clusters that are formed. Every cluster is managed by a network device, which is equivalent to a subscriber device (i.e. it has an ID and encryption keys that are treated just like any ID and encryption keys of a regular device, as described above). Therefore, in reality, in every cluster, there are 999 user devices and one network device, all with encryption keys and ID as depicted in FIG. 4. The 999 devices within a cluster cannot communicate with a device outside of the cluster—it must send the message to the network device of that cluster, and this network device will send it further outside of the cluster.

b. One way to address the delay issue between when the sender sends the message and the receiver receives it, is by means of matching the network performance, such as network bandwidth with the capabilities that are accepted in a call. For example, consider a call between subscriber x and subscriber y, where subscriber x (with phone number x) has ID=4 and therefore is in cluster-1, and subscriber y (with phone number y) has ID=2700 and therefore is in cluster-3. The communication between subscriber x and subscriber y consists in discrete send-transmit-receive cycles. The type of communication where this delay is most disturbing in term of effects, is the call style communication, as described above. For the time distributed communication, this issue is not important at all, and for the equalized activity communication, this issue is important only when the delay is larger than a set time, as explained, therefore it is important in cases such as very high network activity. In the call style type of communication, one such send-transmit-receive cycle is defined as a cycle where the send and receive parts, or steps, are allocated a fixed 30 seconds duration, i.e. subscriber x talks for 30 seconds, sends the data to subscriber y, then subscriber y talks for 30 seconds and sends the data to subscriber x, all in sequential steps (and that is why the term discrete). The cycles repeat from subscriber x to subscriber y and from subscriber y to subscriber x until the call ends. Details will be clarified next. The 30 second time interval is considered as an example, with the following reasoning. Considering 100 kbps data rate for a voice call, 30 seconds will mean 3 Mb of data. If the network bandwidth is 100 Mbps, in one second 32 simultaneous calls to or from the same device can be accommodated. Why 32 devices, will become apparent and fully explained later for full understanding. Another related aspect to note in term of choosing the 30 second (or other timing) duration of talk time, is that a data package (real or simulated) will be 3 Mb. Since each device will perform a large number of decrypt operations in order to determine if a message was addressed to that particular device and to determine which device sent it, this 3 Mb per package will be multiplied by the number of decrypt operations. The decrypt time therefore depends on the size of the package (3 Mb), on the number of decrypt operations each device does, and on the device speed with implications on architecture. The implementation of device clustering (mentioned above) has a significant impact on how many decrypt operations each device does (for example, multiple clustering levels can be implemented to reduce the number of decrypt operations that a device does).

c. As discussed above, a user initiating a call, or a real sender, has the option to choose a number of simulated senders, in order to conceal its identity. Choosing who the simulated senders are must be done also in a concealed way, such that a third party or the network cannot detect. As described above, in addition to choosing and setting the simulated senders, there are several similar operations that need to be similarly implemented: these are setting the simulated receivers, defining the communication options, and the conferencing option. Each of these are briefly discussed below. Alternatives and optimizations will be immediately obvious to a person skilled in the art, therefore the discussions and examples presented below are to introduce the fundamental concepts and provide appropriate understanding of the requirements, and in no way these discussions and examples limit the disclosure.

i. All concealed communications for these operations are performed using the same principles as discussed across this disclosure-everything is encrypted, placed in a pool where all devices in that pool can see the communicated data, all users in the said pool will take and decrypt that data, and only the user that has the correct key and will decrypt the message correctly will be able to read it and take the appropriate actions as found in the message-all these will be self understood below and will not be mentioned anymore.

ii. As mentioned, for every cluster, there is a network device that will manage communication within a cluster. This is done to reduce the network and device activity for a large subscriber network, and consequently improve the response time and delay sender-receiver, while at the same time reducing the cost and network resources.

iii. When a device within a cluster initiates a call, this device will set a number of simulated senders, as chosen by the user initiating the call. Automatically, same number of simulated receivers must be set. These simulated senders and receivers are set as follows. It should be mentioned that this procedure is done at fixed set time intervals, and is not triggered by any device or condition, which can be detected or seen on the network.

i. Every device within a cluster sends its network device cluster manager if it will initiate a call or not, and if the flag that it will initiate a call is set, the number of needed simulated senders. Every cluster manager will receive the same info, each from its own devices in the respective cluster.

ii. Once every cluster manager receives this info, each cluster manager will send its data to the other 999 cluster managers. A cluster manager that does not have devices initiating calls, it will still send that it needs zero simulated senders—but it must still send because it must create uniform traffic in the network, so that the real requesting clusters remain concealed. At this point, all cluster managers will know how many simulated senders are needed in the network at that time. The cluster managers will also know how many real senders are in the network at the time, since the cluster manager requesting non-zero simulated senders means that it has a real sender.

iii. Since all cluster managers will know how many simulated senders are needed in the network, each cluster manager will send as many random numbers in the range of 1 to 1000 (the number of clusters), to all other cluster managers. To simplify the discussion, consider that for all clusters, there is only one device, in only one cluster that initiates a call, and this device needs three simulated senders. Clearly, in this example case, there will be three simulated senders and three simulated receivers needed, therefore, every device manager will send to the other device managers six random numbers in the range 1 to 1000.
iv. If all 1-to-1000 numbers would be sent in-between the cluster managers, as described above, with the same probability, the average number of occurrences for every number will be 6, but since these sets of numbers are randomly selected by every cluster manager, some of these numbers will have more than 6 occurrences, others will have less. The 6 numbers out of the 1000 with most occurrences will be chosen. The first three numbers will be the cluster numbers that will have the simulated sender devices, and the last three numbers will be the cluster numbers that will have the simulated receiver devices.
v. A simulated sender/receiver pair will be needed by the simulated sender device; the simulated receiver cluster does not need this info now, because the receiver cluster and device is encrypted by the sender as destination (as described above and will be disclosed below further).
vi. Since every cluster manager will know which cluster managers requested simulated senders, they may eliminate from the random number generator those clusters so that no cluster will have both real senders/receivers and simulated senders/receivers, situation which may create a network traffic peak (imbalance) that could be observable by network respectively a third party.
vii. Note that all this process is not visible neither by the network nor by a third party—the outside world will only see uniform network traffic in-between a multitude of devices. Every device manager will be able to see by itself if it will have a simulated sender/receiver. Once it does that, it will generate a random number with value between 1 and 1000 and send it inside its cluster.
  1. The above random number represents the device, within that cluster, which is assigned to be a simulated sender or a simulated receiver. The cluster manager can send this random number to all devices in the cluster, and only the device intended will read it correctly—that would be done to continue the uniform network activity down to the device, but that does not make sense, because the simulated sender/simulated receiver identity within that cluster will be revealed anyway (as a group of all simulated senders within all clusters) once these start sending the simulated data. Therefore, in order to reduce the network activity (because that is the goal of forming clusters), every cluster manager will send the simulated sender/receiver assignment only to the respective assigned device. In order to mask the real sender, the cluster manager will send such data to the sender device as well even if obviously the sender device knows he is a eal sender—in this case, the real sender will interpret this data as a flag informing the device it can send the real data. For the simulated senders, the device reading this random number will be aware that it will be a simulated sender, and as mentioned above, it will be communicated about the simulated receiver it will send the simulated data to as well. If a cluster manager will not have a sender/receiver assigned, it will not send any such random number within its cluster.
  2. It is clear at this time that the use of clusters will drastically reduce the network activity, essentially with no penalty on the concealment of the real sender and receiver.
viii. For future reference in this disclosure, this process of setting concealed devices for a send/receive purpose, that has been presented above, will be called "random voting process".
ix. Note that for best concealment of the real sender/receiver device, the simulated senders and receivers have been chosen above, in the random voting process, to belong to multiple clusters. A similar but simpler random voting process can be done within a single cluster, and in this case the six simulated senders/receiver devices will belong to a single cluster. This will be less demanding for the network traffic, but less secure for the real data.
iv. A random voting process can be initiated to set an idle network activity, when there is none, or a small amount of real calls in the network. For example, for this idle network activity, 100 simulated senders and 100 simulated receivers can be set with a random voting process. This idle network activity will be highly beneficial to hide the real senders and real receivers in the conditions of a low activity network.
v. The communication option, i.e. as a time distributed communication, as an equalizing activity communication, or as a call-type communication, is specified by the user initiating the call, depending on multiple criteria desired by this user, such as security (time distributed communication is the best), or speed of communication (call-type communication is the best), or a trade-off security-speed (equalizing activity communication is the best). To set the communication option, a two bit flag, set by the user initiating the call, will be communicated to the real sender/receiver and to the simulated senders/receivers, and all these senders/receivers will behave accordingly, as described above.
vi. The conferencing option is only an extension of the single-thread communication (single real sender and single real receiver) described above. In a conferencing communication, there is one real sender and multiple real receivers at any given time, and the real sender circles with the real receivers. Everything described above for a single-thread communication is adapted to this configuration of sender/receivers. For example, consider one real sender and three real receivers, which circle. For a factor of three simulated senders that is specified by the user, there will be three simulated senders and nine simulated receivers at any one time, which circle in-between them as well The three simulated senders and the nine simulated receivers are chosen through a similar random voting process adapted for a conferencing communication. The conferencing communication style can also be carried as one of the three communication styles disclosed above; these can all be supported in a conferencing communication as well.

d. An example for the data format from a device sending real data and a device sending simulated data is discussed next. The format consists in a data package in four parts:
  i. For the device sending real data:
    i. Part-1 is a header, called Header-1. Header-1 contains the device manager ID and encryption key for the cluster in which the sending device resides.
    ii. Part-2 is a header, called Header-2. Header-2 contains destination cluster manager (ID and encryption key).
    iii. Part-3 is another header, called Header-3. Header-3 contains the destination device ID and phone number within that cluster, as well as the origin device ID and phone number.
    iv. Part-4 contains the message from sender to receiver.
  ii. For the devices sending simulated data:
    i. The four parts are similar. The only observation is that part-4, the message, contains simulated data that is random generated to have a non-uniform content. A random, non-uniform content is essential so that it cannot be detected and invalidated using data analysis.
  iii. Note the following in term of how the data traffic occurs from sender to receiver:
    i. When a device sends data (real or simulated), that device sends the data first to the 1000 devices in its cluster. Only the device manager can decrypt that data from Header-1, and the device manager cannot read the other two headers and the message. No other device in the cluster can read any of the four parts.
    ii. Once the device manager reads Header-1, sends the remaining three parts to all other 999 device managers, which read Header-2. Only the device manager that can read Header-2, will send Header-3 and the message in its cluster.
    iii. The device manager that read Header-2, will send Header-3 and the message to all devices within its cluster.
    iv. Only the device that can read Header-3 will be able to read the message and know which device to respond to.
    v. Note that at all levels (within a cluster, and in-between clusters) all devices will receive the same data to process, therefore the identity of the target device (such as the target cluster device or the receiver device) cannot be determined from the network analysis (activity or traffic).
    vi. If the data in the message is real (and not simulated), the device that will decrypt header-3 correctly, will actually make the phone ring, and only then the subscriber is aware that it received a call. If the data in the message is simulated, the device that will decrypt header 3 correctly will not make the phone ring and will not read the simulated data in the message—the only action will be to know to respond with simulated data to the same device from where the simulated data was received. That is true for equalizing activity communication and for call style communication. For time distributed communication keeping the same devices do not apply, as explained. The type of communication is encrypted in Header-3.

e. When there is large network traffic, such as in the case of multiple calls, a specific device may be solicited at the same time by more than one call. The typical situation is when a device will need to send multiple simulated data, or it has to send both one real data and one or more simulated data. That means that the respective device has been chosen multiple times. That is acceptable. Of course, if the device has been chosen once for a call, a restriction can be placed so that the device is not chosen again for other calls, but that may be inefficient when for example a higher security is implemented (such as when 31 devices to send simulated data are chosen) with high activity in the network (multiple calls). In this case, the number of real calls may end up being limited since most devices will be taken by sending/receiving simulated data. A subscriber may not even be able to make a call, since its device will be taken in handling simulated data. That is why a device must support to send data for multiple calls at the same time. As mentioned above, when "how to address the delay issue" was discussed, the 30 second talk time interval has been chosen to allow 32 calls to be handled by one device in order to produce a delay of one second, for a network bandwidth of 100 Mbps. These 32 calls can be either one real call and 31 simulated calls, or 32 simulated calls. This 32 calls capability for one device means that within a cluster of 1000 devices and 32 device for one call concealing capability to hide the real sender, there is a 1000 real call capacity at one time per cluster which means that all subscribers in the cluster are allowed to make a call at the same time. This is the best capability possible, and may never happen, so, optimizations can be made, optimizations that will lead to increasing the talk time from the 30 seconds interval to a larger interval, or to decrease the mentioned delay, and other optimizations. Such optimizations are not detailed in this disclosure, because they are obvious to a person skilled in the art.

f. A call ends simply by any of the two active subscribers (active parties in that call) not responding anymore.

Above, untraceable encrypted calls have been described in various versions, implementations, and concealment options. Besides untraceable encrypted calls, direct encrypted calls are possible as well. Also, a caller not supporting untraceable encrypted calls or direct encrypted calls (i.e. supporting just plain non-encrypted and traceable calls) may call a subscriber (device) supporting encrypted and untraceable calls.

For direct encrypted calls the following occurs. An example is used:
  I. When device with ID=4 (cluster 1) with phone number x makes a direct call to device ID=2700 (cluster 3) with phone number y, then within device 4, the key at ID=2700 will be used to encrypt the message for phone number y.
  II. Compared to any of the untraceable call versions presented above, just the message part makes sense to be encrypted in a direct call. That is because a direct call will not use any simulated senders or simulated receivers, and accordingly, when device ID=2700 responds to device ID=4, its identity will be revealed just like the identity of device ID=4 was revealed when it send a message to device ID=2700. If the devices would have their identity encrypted in a header, their identity would be revealed by a simple network activity analysis, therefore in a direct call it makes no sense to have their identity encrypted, therefore, in a direct call, their identity is open.

III. Note that in a direct call, the network activity is just to carry the call. Therefore, the delay aspect discussed for untraceable calls is non-existent. Also, only call type communication (from the three types of communication discussed for untraceable calls) makes sense for direct calls.

To summarize how the untraceable capability is achieved, according to this disclosure:

A. One of the key aspects enabling this capability is that any device can uniquely communicate with any other device. Therefore, the two devices do not have to be specified in clear—the information identifying the two devices is encrypted, using the key specific to the communication between the two devices.

B. The encrypted data, including the identification of the two devices that are part of the communication, is sent to a large pool of devices—by doing that, the receiving device is hidden. The identity of the two devices reveals to themselves only, and that happens when the decryption gives the correct output. Only the device that gets the correct output will read the message from the sending device. All this is not visible by anybody in the network, nor by the network itself through such means as traffic analysis, because all the traffic in the network is the same for all devices.

C. To conceal the sending device as well, a set of random devices are chosen to perform a data send operation in parallel to the device performing the real send operation. Similarly, these random devices behave exactly the same as the real sending device in the network and from the point of view of all other aspects, so that no detection can be performed in term of determining the real sending device.

D. Note that all this is achieved at the cost of increased network traffic, both to hide the receiver and to hide the sender.

E. The clusters are introduced to reduce this network traffic, because otherwise for example, in the absence of clusters, for example the data from the sender would be send to all 1 million devices in the network, instead of to 1000 devices from a specific cluster and to the 1000 cluster network devices. In order to handle this network traffic, the equipment has to have a parallel architecture for sending and receiving data in the network to multiple devices at the same time. The said switchboard is the preferred suggested implementing equipment for this facility. The performance level of this equipment will define key behaviour of an encrypted and untraceable call, such as the delay between when the sending subscriber sends the message and when it receives back an answer from the other subscriber to which the message was directed to. Clearly, this delay depends on the mentioned equipment capability, but also on the network performances, such as the network bandwidth. This also depends on the message duration—in the example discussed above for the most critical type of communication for the delay consideration, the message was chosen to be 30 seconds—if the duration is increased, the delay increases. Also, if in the network there is a large volume of calls at one time, the delay increases because the data traffic increases and the equipment, and clusters, and devices, have to process more data. The delay also depends on the size of the cluster, the number of cluster levels, and the number of clusters within one level, as shown.

F. Direct encrypted calls, or calls from users making regular, traceable calls, are handled in specific ways, as described.

Multiple aspects, particularities, and optimizations can be outlined, but the essence of the disclosure is complete at this time, with the above description, showing how to make an encrypted call that is unique in-between any two devices in the network, and how to make an untraceable call, where both the sender and the receiver cannot be identified by a third party, including by means such as analyzing the network traffic or any node or equipment devices in the network.

Some specific aspects that are worth mentioning here, to complete the disclosure:

1) Note that in places such as Header-3, both the ID and the phone number for a communicating device (real or simulated) are specified. From the internal functionality point of view, specifying both the ID and the phone number represent redundant information, because within a given device, the IDs have a pre-determined order from the manufacturer, and the phone numbers have a pre-determined order from when the carrier downloads the subscribers to every device, as disclosed above. However, specifying both ID and phone number is an extra security measure, since for example a SIM card cannot be used on any other device than the original device assigned by the carrier. If a SIM card would be used on a different device, the phone number would not match the IDs, therefore the calls would not be able to be decrypted by anybody in the network.

2) If a first subscriber (first device) is in a real call and is being called by another subscriber (another device), a busy line signal is sent by the first device to the said another device. There is no risk of revealing who the first device is, since both devices are covered by at least a chosen number of simulated devices (if not by an additional high network traffic environment), If the said another subscriber chooses to end the call when receives the busy signal, to a third party the network traffic will show as having a short call traffic. The said another subscriber can also wait on line until the first caller ends the call in progress, and this hold (wait) time is handled by the simulated devices involved in this another call, which in this time will send and receive simulated data.

3) A special situation is when a first device is in an encrypted untraceable call, and a second device calls this first device when the said second device is calling in a direct encrypted call the said first device. In this case, a busy signal will reveal the first device as being in an encrypted untraceable call. In this case, the first device will send a hold signal on the untraceable call, which will be handled as described above with no risk for the first device or any other device involved in the first call to be revealed, and will take the direct encrypted call, this way protecting the integrity of the untraceable encrypted call. Exactly the same way is handled when the said first device is called by a third device, where this third device is making plain (non-encrypted and traceable) calls.

While examples have been disclosed for telephone communication, similar can be applied to any other type of communication such as:

Laptop to laptop, or laptop to telephone, or communication in-between similar devices, including IOT communication. The only difference with what is already disclosed above is that instead of a telephone number, other form of identification is used, such as the IP address. Form of identification here does not refer to the chip or software ID, which remains with the same implementation, functionality, and meaning.

The actual practical applications are countless, since such communication will provide the ultimate security, by providing both dedicated encryption, and, at the same time, means to enable that no third party can detect the two parties that communicated, in fact a third party cannot detect not even that the two parties were even in any active real call (the two parties show on the network, but they may be sending simulated data).

From reading the present disclosure, other variations and modifications will be apparent to the skilled person. Such variations and modifications may involve equivalent and other features which are already known in the art or are implied by the embodiments presented in this disclosure. Such variations and modifications may include variations in protocol, increase in performance such as improvements in the communication delay, variations that do not change the substance and object of this disclosure.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. An encrypted and untraceable communication, comprising:
   a first specially enabled device representing a first user;
   a second specially enabled device representing a second user;
   a network of specially enabled devices called device network, overseen by a device network manager;
   a subscribing procedure for a said device to subscribe to said device network, comprising:
      obtaining communication service from any communication service provider, with said provider assigning an address or a phone number to said device; and
      communicating by said device network manager to all said devices in said device network that said device subscribed to said device network with a said address or phone number;
   an input data stream (IFDS) of a first size equal to a first number of bits, with said first device, called sender, encrypting said IFDS, generating an output file called output encrypted data of a second size equal to said first size, and sending said output encrypted data to said second device, called receiver, with said receiver receiving said output encrypted data, and decrypting said output encrypted data to obtain said IFDS;
   a process to encrypt said IFDS by said first device, comprising:
      partitioning said input data in processing strings (PS) as they serially occur in said input data, with every said occurring PS belonging to a set of PS, comprising:
         every PS in said set is unique and has a number of bits greater than a minimum number of bits;
         there is one or more PS having the same number of bits, and all PS of same number of bits form a class of PS, with a PS in a class being a member of that PS class;
         within a class of PS, one or more PS are represented by a common header called root identifier (RI) with said RI having a number of bits that is smaller or equal to the number of bits of that class of PS, followed by a difference number of bits equal to the difference between the number of bits of that class of PS and the number of bits of said RI, where said difference number of bits is called remain;
         all RI of all classes of PS form a set of RI, with every RI in said set of RI having a number of bits greater than a minimum number of bits and being unique, with one or more RI having the same number of bits, and with all RI of same number of bits forming a class of RI with an RI in a class being a member of that RI class; and
         all remain of all classes of PS form a set of remain, with one or more remain having the same number of bits, and with all remain of same number of bits forming a class of remain with a remain in a class being a member of that remain class;
      describing said input data by said occurring PS, and, by making correspondence between every occurring PS and the corresponding said RI and remain, describing said input data by said occurring RI and occurring remain, with said occurring PS, occurring RI and occurring remain creating a content of said input data;
      encrypting said input data by permutating said members of every said PS class, RI class, remain class according to a permutation configuration for every class, such obtaining permutated classes, and by replacing every said occurring PS, RI, remain, with their corresponding counterpart in said permutated classes; and
      employing an encryption key during said process to encrypt said IFDS, comprising:
         a total number of bits comprising a first number of bits specifying each PS class, RI class, or remain class that is permutated and a second number of bits specifying said permutation configuration of said members of every said class that is permutated;
         said encryption key being hardcoded in said first and second device;
         said encryption key is dedicated for said communication between said first and second devices only, specifically to encrypt/decrypt data to/from said first/second devices only; and said first user is specifying, at the initiation of said communication between said first and second device, inside said first device only, to encrypt said IFDS for said second device by specifying said second device address or phone number, such retrieving said hardcoded encryption key dedicated for said communication between said first and second devices;

a process to decrypt said output encrypted data by said second device, comprising:
retrieving said hardcoded encryption key dedicated for communication between said first and second device;
decrypting said output encrypted data by replacing said RI, PS, remain with the corresponding RI, PS, remain of the non-permutated said classes in accordance to said encryption key; and
outputting the decrypted output encrypted file, which is said IFDS; and a procedure to conceal to any part of said device network, to said device manager, and to anybody outside of said first and second devices, any identification information for said first and second devices that are part of said communication, including said address or phone number of said first and second devices, and said encryption key used by said first and second device during said communication.

2. The encrypted and untraceable communication of claim 1, wherein said first size and said second size are not equal, comprising:
at least one said permutation configuration in said encryption key indicates permutations that are performed for said members of two or more said classes together.

3. The encrypted and untraceable communication of claim 1, wherein said procedure to conceal comprising:
a first number of said specially enabled devices are said subscribed into said device network;
a procedure to conceal the identity of said receiver, comprising:
sending said output encrypted data by said first device, encrypted with said hardcoded encryption key dedicated for communication with said second device, to all said first number of devices;
receiving said output encrypted data by all said first number of devices; and
decrypting said output encrypted data by each of said first number of devices, wherein only said second device will correctly decrypt said output encrypted data with said hardcoded encryption key dedicated for communication with said first device with which said output encrypted data was encrypted, and which is hardcoded only in said first and second device.

4. The encrypted and untraceable communication of claim 3, wherein said procedure to conceal further comprising:
a functional block within each of said first number of devices, with said functional block detecting a said correct decrypt, consequently notifying said user of said device of an incoming said communication, wherein;
said functional block for said second device is detecting a said correct decrypt and is notifying said second user of an incoming said communication; and
said functional blocks of all other devices but said second device do not detect a said correct decrypt, and none of these other devices notify said users of these other devices.

5. The encrypted and untraceable communication of claim 4, wherein said procedure to conceal further comprising:
a second number of devices, called simulated senders, that are randomly chosen out of said first number of devices; and
each of said simulated senders is triggered by said sender to encrypt random data for a randomly chosen receiver called simulated receiver, creating simulated traffic in said device network in order to conceal the identity of said sender, comprising:
said simulated receiver is one of said first number of devices that is not a simulated sender;
said random data is encrypted using a said encryption key dedicated for communication between said simulated sender and said simulated receiver, so that only said simulated receiver can correctly decrypt said random data; and
said functional block of a said simulated receiver will not notify said user of said simulated receiver upon said correct decrypt of said random data, but will make said simulated receiver to encrypt simulated data for said simulated sender when said receiver responds to said sender.

6. The encrypted and untraceable communication of claim 1, wherein said procedure to conceal comprising:
a first number of said specially enabled devices are said subscribed into said device network;
a second number of groups of said devices, called clusters, with said first number of devices being divided into said clusters;
a said device in each said cluster is called cluster manager, with the rest of said devices in each cluster being a third number of said devices, called cluster members; and
when said first device is in a first said cluster with a first said cluster manager and said second device is in a second said cluster with a second said cluster manager, said communication between said first and said second device in order to conceal the identity of said receiver comprising:
said first device sends a packet of data to all said second number of cluster managers, where said packet of data comprising a first part and a second part, with said first part encrypted with a said encryption key dedicated for communication between said first device and said second cluster manager and with said second part encrypted with an encryption key dedicated for communication between said first device and said second device, comprising said output encrypted data;
said second cluster manager, upon correctly decrypting said first part, sends said second part to all said third number of devices in said second cluster, with all other cluster managers having no activity since their decryption of said first part is incorrect due to said encryption key being dedicated for communication between said first device and said second cluster manager; and
decrypting said output encrypted data by all said third number of devices in said second cluster, wherein only said second device will correctly decrypt said output encrypted data with said hardcoded encryption key dedicated for communication with said first device with which said output encrypted data was encrypted and which is hardcoded only in said first and second device.

7. The encrypted and untraceable communication of claim 6, wherein said procedure to conceal further comprising:

a second number of devices out of said first number of devices, called simulated senders, are being triggered by said sender, with each of said simulated senders sending simulated random data to a simulated receiver, creating simulated traffic in said device network in order to conceal the identity of said sender, comprising:
choosing said simulated senders and said simulated receivers, inside said first device, comprising:
sending to said first cluster manager, by said first device, a request for said second number of simulated senders and receivers;
sending to all said cluster managers, by said first cluster manager, a request for a said second number of random numbers with values between one and said third number of devices within each cluster, for both said simulated senders and simulated receivers;
randomly choosing by said first cluster manager, from said second number of random numbers received from said cluster managers, a said second number of devices for each said simulated senders and said simulated receivers, and randomly pairing said chosen simulated senders and receivers into a second number of pairs; and
sending by said first cluster manager, said chosen devices to be simulated senders and simulated receivers within each cluster, to the corresponding said cluster manager; and
encrypting, for each said pair of simulated sender and receiver, a said random data, using a said encryption key dedicated for communication between said simulated sender and said simulated receiver within said pair.

8. The encrypted and untraceable communication of claim 4 wherein said first device sends said output encrypted data to said second device only, therefore enabling a so called encrypted and traceable communication, where said identification information for said first and second device, including said address or phone number, is exchanged outside of said first and second devices.

9. The encrypted and traceable communication of claim 8 wherein no encryption key is used to generate said output encrypted data, therefore enabling a so called regular or no encryption and traceable communication, wherein said output encrypted data is not encrypted.

10. The encrypted and untraceable communication of claim 1, further comprising:
said address or phone number of said first device is used by a third said device; and
a functional block is implemented in each said device, wherein:
said functional block of said third device is checking if said address or phone number of said third device is used by said third device, comprising:
a said hardcoded encryption key in said third device does not exist for communication with itself; and
when said address or phone number of said first device is used by said third device, said functional block is:
detecting a said encryption key with which said first device, is able to communicate with itself, indicating that this is not said first device; and
detecting no said hardcoded encryption key corresponding for the identity of said third device, indicating that this is said third device;
notifying said device network manager, leading to disabling both said first and third devices from further said communication.

11. The encrypted and untraceable communication of claim 5, further comprising:
an additional said encrypted and untraceable communication between a third device and said second device, with said third device sending said output encrypted data to said second device only, therefore enabling a so called encrypted and traceable communication, where identification information for said third and second device, including said address or phone number, is exchanged outside of said third and second devices;
said second device being engaged into a first said encrypted and untraceable communication with said first device where said first and second devices are concealed, and a second said encrypted and traceable communication with said third device where said third and second devices are revealed; and
said encrypted and traceable communication taking priority to preserve said concealment of said first encrypted and untraceable communication, by interrupting said first encrypted and untraceable communication while maintain said simulated traffic active, and restarting said first encrypted and untraceable communication when said second encrypted and traceable communication completes.

12. The encrypted and untraceable communication of claim 7, wherein only said simulated traffic occurs, respectively no communication between said first and said second devices occurs, with said simulated traffic creating a background simulated activity in said device network.

13. The encrypted and untraceable communication of claim 7, defining a conference communication, further comprising:
a first number of said receivers receiving said output encrypted data from said sender which encrypts said IFDS with a said encryption key dedicated for communication between said first device and each of said receivers; and
each of said first number of receivers can switch role with said first device by becoming a said sender and said first device becoming a receiver.

14. The encrypted and untraceable communication of claim 7, where said receiver responds to said sender by said sender becoming a receiver, and said receiver becoming a sender, with said simulated traffic keeping same simulated senders and simulated receivers where said simulated senders becoming simulated receivers and said simulated receivers becoming simulated senders.

15. An encrypted and untraceable communication between a first specially enabled device called sender, representing a first user, and a second specially enabled device called receiver, representing a second user, with said sender and receiver belonging to a device network of a first number of specially enabled devices and with each such device in said network subscribing with any communication service provider, comprising:
a said specially enabled device comprising capabilities to encrypt an arbitrary binary input file (IFDS) into an encrypted IFDS of a same size in term of number of bits as said IFDS, and to decrypt a said encrypted IFDS into said IFDS, using an encryption key, comprising:
partitioning said IFDS into a sequence of processing strings (PS) as occurring in said IFDS, with said occurring PS belonging to a set of unique PS organized in PS classes, and with said PS in a said PS class being called members and having a first number of bits;

describing all said PS within a PS class by one or more unique root identifiers (RI), with said RI for all PS classes creating a set of RI organized in RI classes, and with said RI in a said RI class being called members and having a second number of bits;

said encryption key comprising a first number of bits specifying one or more of said classes, and a second number of bits specifying a permutation configuration for said members of each class specified by said first number of bits generating permuted members within said class, with one such encryption key being hardcoded and dedicated to encrypt/decrypt said IFDS for/from one said device; and said capabilities to encrypt comprising replacing a said occurring PS/RI with a corresponding PS/RI from said permutated members within each said class in accordance to said encryption key, and said capabilities to decrypt comprising replacing within said encrypted IFDS a PS/RI from said permutated members within each said class in accordance to said encryption key, with a corresponding PS/RI from said set of PS/RI;

a process to conceal said receiver, comprising:
sending by said sender said encrypted IFDS to a second number smaller or equal to said first number of devices and greater than one, in said device network, where only said receiver is correctly decrypting said encrypted IFDS by decrypting using said hardcoded encryption key dedicated for communication between said first and said second device;

a process to conceal said sender, comprising:
an equal number of randomly chosen said devices called simulated senders and simulated receivers creating pairs of simulated sender-receiver devices; and said simulated senders and simulated receivers create a simulated traffic in said device network, where each simulated sender in a said pair of simulated sender-receiver devices sends random simulated data to said simulated receiver in said pair; and a functional block within every said device of said device network that is notifying said user of a said device only when said decrypted IFDS is correct and is not said simulated data.

16. The encrypted and untraceable communication of claim 14, further comprising:

a first time interval during which said encrypted and untraceable communication between said first device and said second device occurs;

a second time interval smaller than said first time during which said simulated traffic is keeping same said simulated senders and simulated receivers; and at every said second time interval, said choosing said simulated senders and said simulated receivers repeats.

* * * * *